(12) United States Patent
Johansson et al.

(10) Patent No.: US 8,767,363 B2
(45) Date of Patent: Jul. 1, 2014

(54) METHODS AND ARRANGEMENTS INCLUDING CIRCUIT BREAKING MEANS IN A POWER SUPPLY SYSTEM

(75) Inventors: Mats Johansson, Älvsjö (SE); Enar Sundell, Älvsjö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 40 days.

(21) Appl. No.: 13/516,300

(22) PCT Filed: Dec. 18, 2009

(86) PCT No.: PCT/SE2009/051464
§ 371 (c)(1),
(2), (4) Date: Jun. 15, 2012

(87) PCT Pub. No.: WO2011/075029
PCT Pub. Date: Jun. 23, 2011

(65) Prior Publication Data
US 2012/0250201 A1    Oct. 4, 2012

(51) Int. Cl.
*H02H 3/00* (2006.01)
(52) U.S. Cl.
USPC .............................. 361/62; 361/63
(58) Field of Classification Search
USPC ............ 361/8–12, 93.7–93.9, 62–63
See application file for complete search history.

(56) References Cited

U.S. PATENT DOCUMENTS

| | | | |
|---|---|---|---|
| 5,805,393 A * | 9/1998 | Thomas | 361/6 |
| 6,424,512 B1 * | 7/2002 | Schmacht | 361/93.1 |
| 7,072,160 B1 | 7/2006 | Schweigert | |
| 7,817,382 B2 * | 10/2010 | Yu et al. | 361/13 |
| 2003/0076644 A1 | 4/2003 | Schneider | |
| 2010/0254046 A1 * | 10/2010 | Liu et al. | 361/8 |

FOREIGN PATENT DOCUMENTS

| | | | |
|---|---|---|---|
| EP | 1 028 511 A2 | 8/2000 | |
| EP | 1 724 899 A1 | 11/2006 | |

OTHER PUBLICATIONS

International Search Report, PCT/SE2009/051464, Aug. 26, 2010.
Written Opinion of the International Searching Authority, PCT/SE2009/051464, Sep. 16, 2010.
Response to Written Opinion, PCT/SE2009/051464, Oct. 18, 2011.
Written Opinion of the International Preliminary Examining Authority, PCT/SE2009/051464, Jan. 25, 2012.
Response to Written Opinion, PCT/SE2009/051464, Feb. 24, 2012.
Notification of Transmittal of International Preliminary Report of Patentability, PCT/SE2009/051464, May 16, 2012.

* cited by examiner

*Primary Examiner* — Danny Nguyen
(74) *Attorney, Agent, or Firm* — Myers Bigel Sibley & Sajovec

(57) ABSTRACT

Power modules and related methods are providing configured to supply power from a power source to a power consuming unit. The power module configured to disconnect power in the power module in case of excess currents through the circuit breakers.

20 Claims, 3 Drawing Sheets

METHODS AND ARRANGEMENTS INCLUDING CIRCUIT BREAKING MEANS IN A POWER SUPPLY SYSTEM

CROSS-REFERENCE TO RELATED APPLICATION

This application is a 35 U.S.C. §371 national stage application of PCT International Application No. PCT/SE2009/051464, filed on Dec. 18, 2009, the contents of which are incorporated by reference herein as if set forth in their entirely. The above-referenced PCT International Application was published in the English language as International Publication No. WO 2011/075029 on Jun. 23, 2011.

TECHNICAL FIELD

The present invention relates to arrangements and methods in a system, and in particular to arrangements and methods for supplying power from a power source to a power consuming unit in a system.

BACKGROUND

The requirements on a telecommunication system regarding availability are very high compared to other comparable systems. As the traffic, such as phone calls and data traffic, through the telecommunication system increases the power consumption of the telecommunication system increases. New technologies also make it possible to reduce the size of hardware. This reduction in size results in a higher power consumption in different parts of the telecommunication system since more hardware can be fitted in the different parts.

This means that there is a need for supplying more power to different parts in the telecommunication system. Power is often supplied to the different parts in the telecommunication system through a power cable from a power source to a part in the telecommunication system that requires power. There is, however, an upper limit for how much power that can be supplied through the cable from the power source to the part that needs power. The amount of power that can be supplied through the power cable may for instance be limited by the length of the power cable. Another factor that limits the amount of power that can be supplied through the power cable is the cross-sectional area of the respective conductors in the power cable. If there is a fuse in connection with the power cable this fuse will also limit the amount of power that can be supplied through the power cable.

One solution to this problem is to supply power from the power source to the part that requires power via several power cables in parallel. When using several power cables more power can be delivered to the part in the telecommunication system that requires power.

There is, however, at least one problem associated with this solution, namely the problem of matching the loads supplied by the respective cables in order to utilize as much of the power that is supplied trough one power cable as possible. If for instance 800 W could be supplied through one power cable, then it would be an advantage to for instance supply power to four loads needing 200 W each through this power cable, since this would result in that all the power that could be fed through this cable is utilized. Matching of the loads to fully take advantage of the power supply capacity of the different power cables is however often hard to perform in reality.

One possible solution to avoid the need for load matching on the separate power cables is to connect several power cables to a common fed line 30 as illustrated in FIG. 1a. FIG. 1a illustrates a power source 31 that supplies power to a power consuming unit 32 via three separate power cables 33, 34, and 35, where the three separate power cables are connected to the common fed line 30. This solution doesn't require matching of loads (not shown) in the power consuming unit 32 since all the loads are supplied via the common fed line 30.

A problem with this solution is however that in a case of a short circuit in the power consuming unit 32 there will be a much higher fault current from the power source 31 than in a case with a short circuit on a single power cable. This is because the power cables 33, 34, 35 are connected in parallel between the power source 31 and the power consuming unit 32, which results in a lower resistance between the power source 31 and the power consuming unit 32. The high fault current will result in a high voltage drop at the power source 31 which results in that other power consuming units (not shown) that are connected to the power source 31 will stop working or malfunction.

A solution for reducing the fault current and thereby the voltage drop in case of a short circuit in the arrangement according to FIG. 1 is to connect resistors (not shown) in series with the power cables 33, 34 and 35. This will however result in excessive heat generation.

Another solution is to arrange a hold up capacitor (not shown) in each power consuming unit that is connected to the power source 31. These hold up capacitors will power the different power consuming units in case of a voltage drop at the power source until a fuse trip, which will stop the voltage drop. However, in case of high fault current resulting in a high and fast voltage drop large hold up capacitors in the power consuming units are required. Large hold up capacitors in the power consuming units are also required if the power consumption of the power consuming units are high. This since the hold capacitors must be able to power the power consuming units for a considerable amount of time.

There is therefore a need for an improved solution for increasing the amount of power that can be supplied from a power source to a power consuming unit, which solution solves or at least mitigates at least one of the above mentioned problems.

SUMMARY

An object of the present invention is thus to provide methods and arrangements that increase the amount of power that can be supplied from a power source to a power consuming unit This object is according to the present invention achieved by including circuit breaking means in the power feeding means supplying power from the power source to the power consuming unit. These circuit breaking means are configured to disconnect the power feeding means from the power source in case of excess currents through the circuit breaking means.

According to a first aspect, the present invention relates to a power module for use in supplying power from a power source to a power consuming unit. The power module comprises at least a first and a second power input means for inputting power to the power module. The first and second power input means are connected to a power source. Power output means are further arranged in the power module for outputting power from the power module to the power consuming unit. The power module further comprises first power feeding means connected between the first power input means and the power output means. Second power feeding means are connected between the second power input means and the power output means in the power module. The first power feeding means further comprises first circuit breaking means configured to disconnect the first power feeding means from the power source in case of a first excess current through the first circuit breaking means. The second power feeding means further comprises second circuit breaking means configured to disconnect the second power feeding means from the power source in case of a second excess current through the second circuit breaking means.

According to a second aspect, the present invention relates to a method for supplying power from a power source to a power consuming unit. The method comprises the steps of: receiving power through at least a first and a second power input means, where the first and the second power input means are connected to a power source; outputting power from the power module to the power consuming unit through power output means; feeding power through first power feeding means connected between the first power input means and the power output means; feeding power through second power feeding means connected between the second power input means and the power output means; disconnecting the first power feeding means from the power source in case of a first excess current through a first circuit breaking means connected between the first power input means (5) and the power output means; and disconnecting the second power feeding means from the power source in case of a second excess current through a second circuit breaking means connected between the second power input means and the power output means.

An advantage with embodiments of the present invention where MOSFET transistors are used in the circuit breaking means is that the MOSFET transistors allow very fast disconnection of the first and second power feeding means from the power source. Using MOSFET transistors in the circuit breaking means allows a much faster disconnection than if electromechanical circuit breaking means or fuses where used in the circuit breaking means. Rapid disconnection of the first and second power feeding means from the power source minimizes fault currents and thereby voltages drops at the power source.

Yet another advantage with embodiments of the present invention where MOSFET transistors are used in the circuit breaking means is that the current through the MOSFET transistor can be detected by measuring a voltage across the MOSFET transistor. Thereby it is easy for the circuit breaking means to detect excess currents passing through the MOSFET transistor.

A further advantage with using MOSFET transistors in the circuit breaking means is that MOSFET transistors consume very little energy and produce very little heat.

Yet a further advantage with exemplary embodiments of the power module according to the present invention, where the first and the second circuit breaking means are further configured to respectively disconnect the first and the second power feeding means in case of a current in an opposite direction compared to normal operation is that a back current may result in that fuses in the power feeding means trips.

BRIEF DESCRIPTION OF THE DRAWINGS

The invention will in the following be described in more detail with reference to enclosed drawings, wherein.

DETAILED DESCRIPTION

In the following description, for purposes of explanation and not limitation, specific details are set forth, such as particular sequences of steps, signalling protocols and device configurations in order to provide a thorough understanding of the present invention. It will be apparent to one skilled in the art that the present invention may be carried out in other embodiments that depart from these specific details.

Moreover, those skilled in the art will appreciate that functions and means explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

Figure 1A:
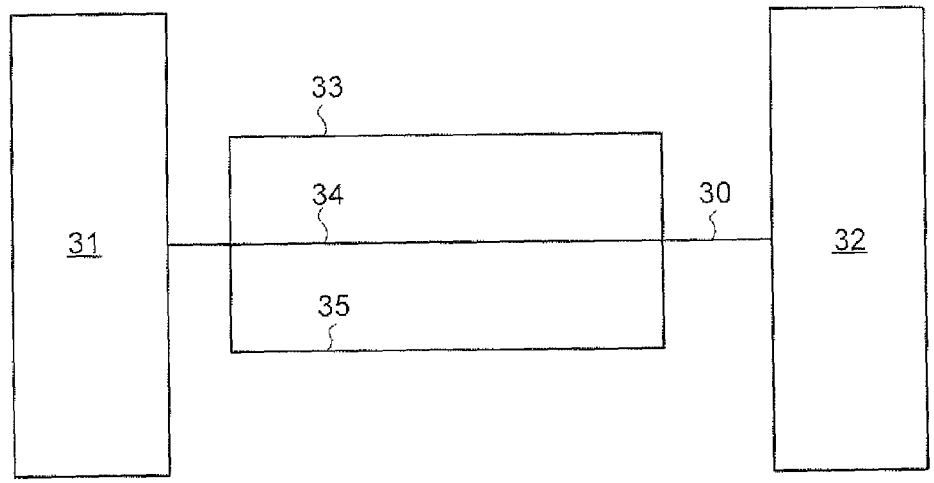
FIG. 1a illustrates schematically a connection arrangement.
Figure 1:
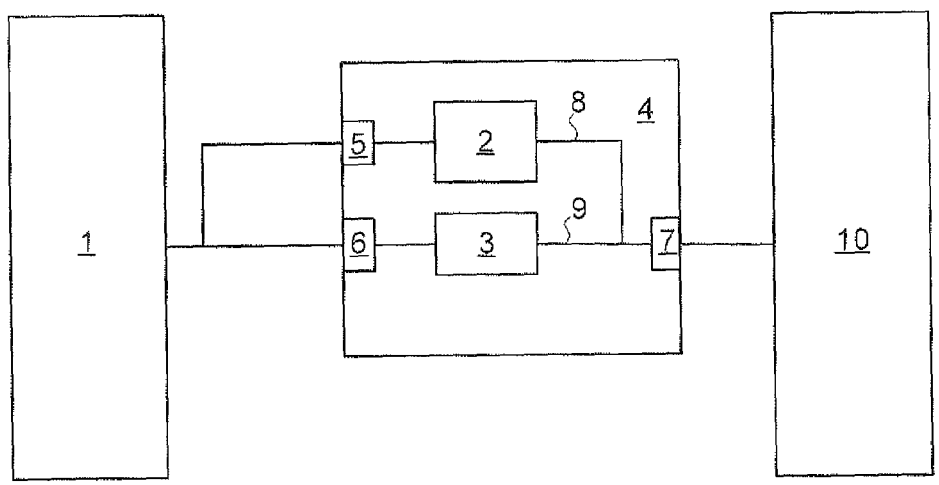
FIG. 1 illustrates a block diagram of a power module according to an exemplary embodiment of the present invention.

FIG. 1 shows a power module 4 for use in supplying power from a power source 1 to a power consuming unit 10 according to an exemplary embodiment of the present invention. The power module 4 comprises a first and a second power input means 5, 6 for inputting power to the power module 4. The power input means 5, 6 may for instance be electrical connectors. The exemplary embodiment according to FIG. 1 comprises two power inputs means 5, 6, but the power module 4 according to the present invention may comprise more than two power input means. The power input means 5 and the power input means 6 are connected to the power source 1. The power source may for instance be a battery which supplies power at a voltage of −48 volts. The power module 4 further comprises power output means 7 for outputting power from the power module 4 to a power consuming unit 10. Output means 7 may for instance be an electrical connector. Between the first power input means 5 and the power output means 7 there are first power feeding means 8 for feeding power between the first power input means 5 and the power output means 7. Second power feeding means 9 are connected between the second power input means 6 and the power output means 7 for feeding power between the second power input means 6 and the power output means 7. The power feeding means 7, 8 may for instance be power cables or conductive traces on a printed circuit board.

The first power feeding means 8 further comprises first circuit breaking means 2 that are configured to disconnect the first power feeding means 8 from the power source 1 in case on an excess current through the first circuit breaking means 2. Second circuit breaking means 3 are also arranged in the second power feeding means 9. The second circuit breaking means 3 are configured to disconnect the second power feeding means 9 from the power source 1 in case of a second excess current through the second circuit breaking means 3.

Thus, according to the present invention, circuit breaking means 2, 3 adapted to interrupt the power supply through the first and the second power feeding means 8, 9, respectively are provided in the power module 4. These circuit breaking means 2, 3 are configured to disconnect the power feeding means 8, 9 from the power source in case of excess currents through the first circuit breaking means 2 and the second circuit breaking means 3, respectively. If, for instance, there is a short circuit in the power consuming unit 10 then a high current will flow from the power source 1 through the power output 7. This high current will be detected by the first and second circuit breaking means 2, 3, respectively, which will disconnect the first and second power feeding means 8, 9 from the power source 1. This will stop the high current flowing from the power source 1 through the power output means 7 and thereby also prevent a voltage drop at the power source 1.

According to exemplary an embodiment of the present invention the first and second circuit breaking means 2, 3 are further configured to disconnect the first and the second circuit breaking means 2, 3 quicker in a case of a higher excess current than in a case of a lower excess current. Disconnecting the first and second power feeding means 8, 9 quicker in case of a higher excess current compared to a case with a lower excess current will decrease the voltage drop at the power source I even further.

In a further exemplary embodiment of the present invention the first and the second circuit breaking means 2, 3 comprise a respective MOSFET, metal oxide semiconductor field effect transistor, transistor. In this exemplary embodiment the first and second circuit breaking means 2, 3, respectively, detect the excess currents by measuring a voltage across the MOSFET transistor. An advantage with using MOSFET transistors in the circuit breaking means 2, 3 is that the current through the MOSFET transistor can be detected by measuring a voltage across the MOSFET transistor. Yet another advantage with a MOSFET transistor in the circuit breaking means 2, 3 is that MOSFET transistors consume very little energy and produce very little heat. Thereby it is easy for the circuit breaking means 2, 3 to detect excess currents passing through the MOSFET transistor. Yet another advantage with using MOSFET transistors in the circuit breaking means 2, 3 is that the MOSFET transistors allow very fast disconnection of the first and second power feeding means 8, 9 from the power source 1. Using MOSFET transistors in the circuit breaking means 2, 3 allows a much faster disconnection than if electromechanical circuit breaking means or fuses are used in the circuit breaking means. Rapid disconnection of the first and second power feeding means 8, 9 from the power source 1 minimizes fault currents and thereby voltages drops at the power source 1.

Figure 2:
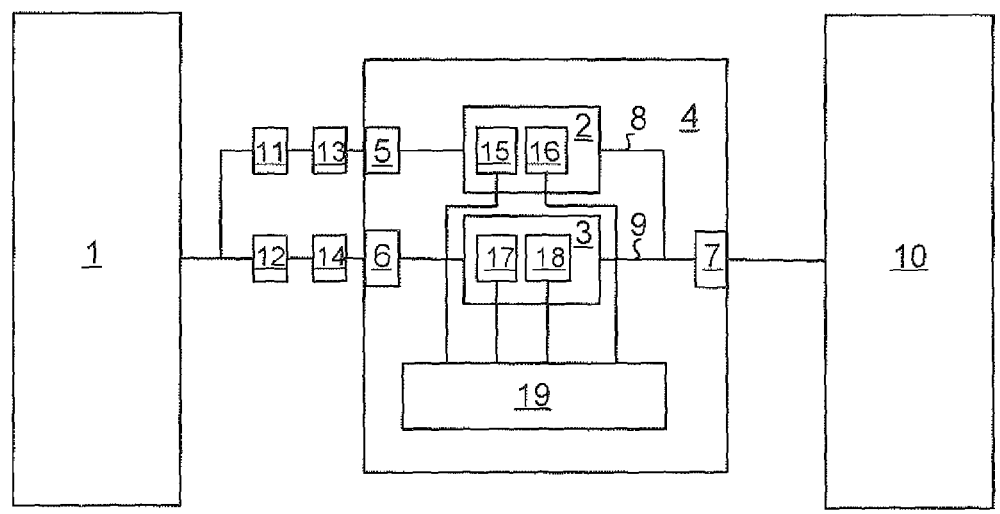
FIG. 2 illustrates a block diagram of a power module according to an exemplary embodiment of the present invention.

FIG. 2 illustrates yet a further exemplary embodiment of the power module 4. In this exemplary embodiment the first circuit breaking means 2 and the second circuit breaking means 3 further comprises registering means 15, 17 for registering if the first and the second circuit breaking means 2, 3 have disconnected the first and the second power feeding means 8, 9 respectively, from the power source 1. In this exemplary embodiment the first and the second circuit breaking means 2, 3 are further connected to a controller 19, where the controller 19 is configured to read the registering means 15, 17.

In an other exemplary embodiment of the power module 4, the controller 19 is further configured to control the first circuit breaking means 2 to disconnect the first power feeding means 8 in a case where the controller 19 has read that the second circuit breaking means 3 has disconnected the second power feeding means 9. In this exemplary embodiment the controller 19 is further configured to control the second circuit breaking means 3 to disconnect the second power feeding means 9 in a case where the controller 19 has read that the first circuit breaking means 2 has disconnected the first power feeding means 8.

The controller may be further configured to initiate delayed reconnection attempts of the disconnected power feeding means 8, 9. The delay for such reconnection attempts may initially be one second, but for repeated disconnections of the power feeding means 8, 9 the delay may be doubled for each reconnection attempt.

In an other exemplary embodiment of the power module 4, the first circuit breaking means 2 and the second circuit breaking means 3 further comprise self testing means 16, 18 that are configured to perform self testing of the first and second circuit breaking means 2, 3, respectively. The circuit breaking means 2, 3 are in this exemplary embodiment further configured to send values from these self tests to the controller 19.

In an exemplary embodiment of the power module 4 according to the present invention a first fuse 13 may be connected between the power source 1 and the first power input means 5. A second fuse 14 may also be connected between the power source 1 and the second power input means 6.

In this exemplary embodiment the first and the second circuit breaking means 2, 3 are further configured to disconnect the first and the second power feeding means 8, 9, respectively, before the first and the second fuses 13, 14 trip.

In yet another exemplary embodiment of the power module 4 according to the present invention the first and the second circuit breaking means 2, 3 are further configured to respectively disconnect the first and the second power feeding means 8, 9 in case of a current in an opposite direction compared to normal operation. If, for instance, there is a short circuit in one of the power feeding means 8, 9, there may be a back current through the power feeding means 8, 9. This back current may result in that the fuses 13, 14 trips. There is therefore an advantage to also disconnect the power feeding mean 8 or 9, in which a current in an opposite direction compared to normal operation occurs.

A first resistor and a second resistor 11, 12 may also be connected between the power source 1 and the first and the second power input means 5, 6, respectively. In this case the first circuit breaking means 2 may be further configured to disconnect the first power feeding means 8 before overheating of the first resistor 11. The second circuit breaking means 3 may in this case also be further configured to disconnect the second power feeding means 9 before overheating of the second resistor 12.

In yet another exemplary embodiment of the power module 4, the first circuit breaking means 2 and the second circuit breaking means 3 are further configured to limit high currents through the first and second circuit breaking means 2, 3, respectively, to a current slightly higher than FUSEtrip, which is the current at which the respectively first and second fuses 13, 14 trip. This means that if the high current falls below FUSEtrip before the fuses 13, 14 trip, the circuit breaking means 2, 3 will go back to normal operation. An advantage with this current limitation is to ensure that extra transient peak currents do not cause voltage drop at the power source 1. Yet another advantage is that tripping of the fuses 13, 14 are avoided. The fuses 13, 14 are often mechanical fuses which need to be manually reset or changed by an operator.

In yet another embodiment of the power module 4 the controller 19 is further configured to wait before connecting the power feeding means 8, 9 until there are enough power feeding means 8, 9 available for being able to supply power to the power consuming unit 10. As mention above there may be more than two power feeding means 8, 9 in the power module 4. If for instance three power feeding means 8, 9 are required to supply power to the power consuming unit 10 the control unit 9 waits until there are at least three power feeding means 8, 9 available before connecting the power feeding means 8, 9 to the power consuming unit 10. The controller 9 may for instance have information how much power that is required and then calculate how many power feeding means 8, 9 that are required. In another embodiment the controller 9 is programmed with the amount of power that is required by the power consuming unit 10 and then calculate how many power feeding means 8, 9 that are required.

Figure 3:
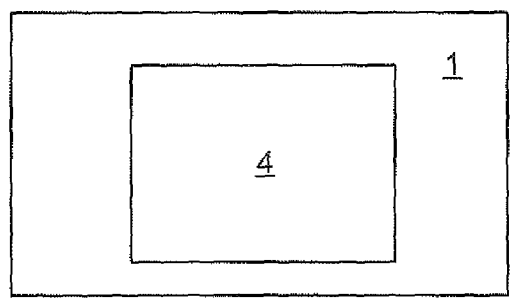
FIG. 3 illustrates a block diagram of a power source according to an exemplary embodiment of the present invention.

FIG. 3 shows a block diagram of the power source 1 according to yet another exemplary embodiment of the present invention. In this other exemplary embodiment the power module 4 according to the above described exemplary embodiments is implemented in the power source 1.

Figure 4:
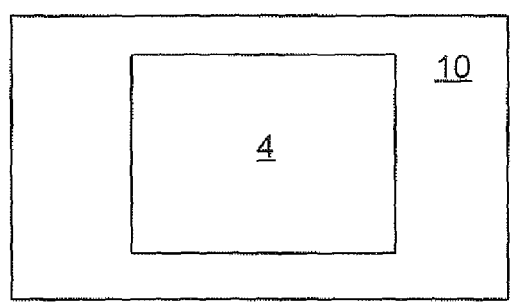
FIG. 4 illustrates a block diagram of a power consuming unit according to an exemplary embodiment of the present invention.

FIG. 4 shows a block diagram of the power consuming unit 10 according to yet another exemplary embodiment of the present invention. In this other exemplary embodiment the power module 4 according to the above described exemplary embodiments is implemented in the power consuming unit 10.

It should be noted that the power source 1 and the power consuming unit 10 depicted in FIGS. 3 and 4, respectively, may comprise other elements or means not illustrated.

Figure 5:
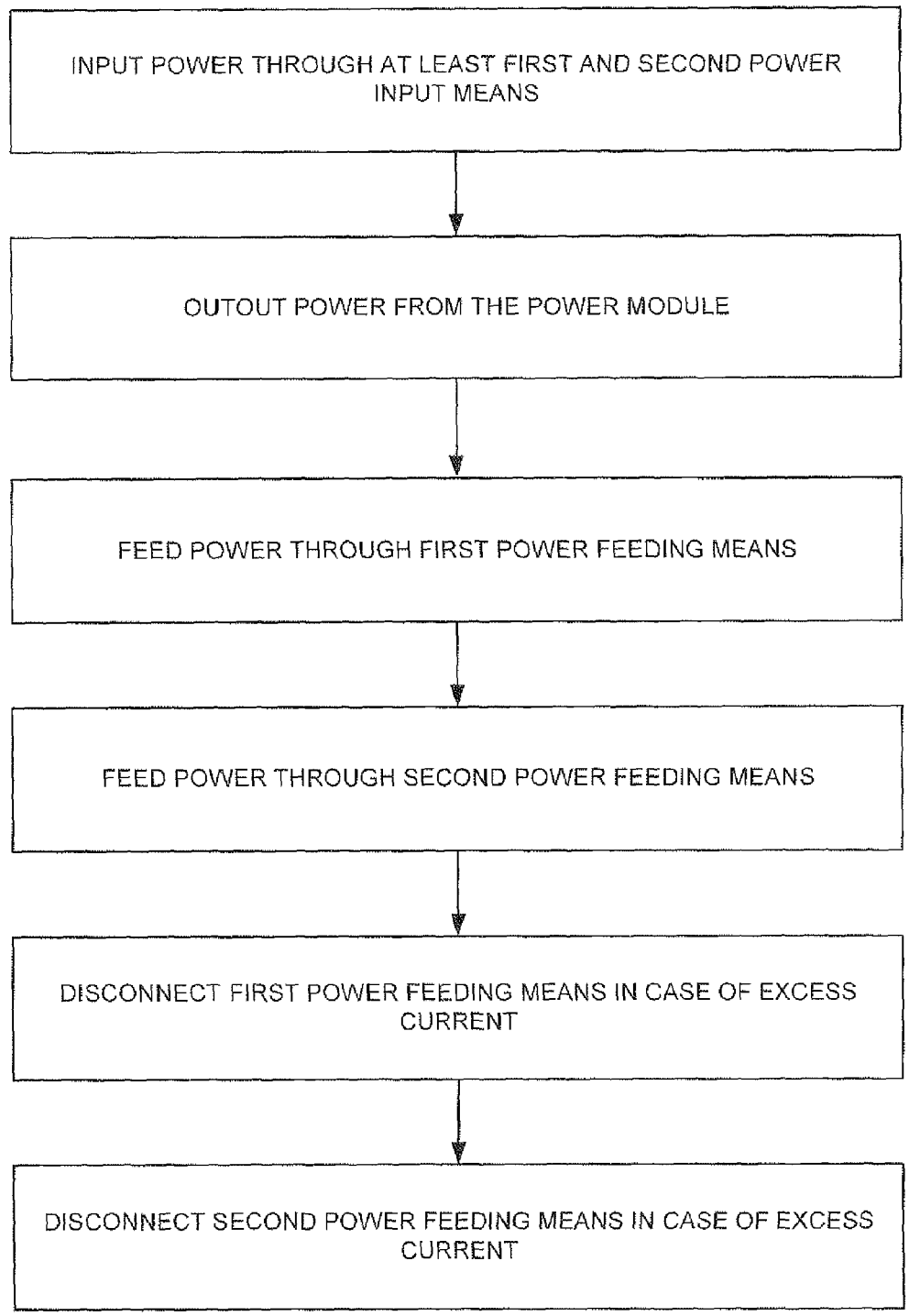
FIG. 5 illustrates a flow diagram of a method according to an exemplary embodiment of the present invention.

Referring to FIG. 5 there is illustrated a flowchart of a method describing the steps for supplying power from a power source 1 to a power consuming unit 10 in accordance with previously described embodiments of the present invention. As shown in FIG. 5, the method comprises:

501 receiving power to a power module (4) through at least a first and a second power input means 5, 6 of said power module; where the first and second power input means 5, 6 are connected to a power source 1;

502 outputting power from the power module 4 to the power consuming unit 10 through power output mean 7;

503 feeding power through first power feeding means 8 connected between the first power input means 5 and the power output means 7;

504 feeding power through second power feeding means 9 connected between the second power input means 6 and the power output means 7;

505 disconnecting the first power feeding means 8 from the power source 1 in case of a first excess current through a first circuit breaking means 2 connected between the first power input means 5 and the power output means 7;

506 disconnecting the second power feeding means 9 from the power source 1 in case of a second excess current through a second circuit breaking means 3 connected between the second power input means 6 and the power output means 7.

Even tough the present invention has been described in connection with a telecommunication system it should be noted that the present invention may as well be implemented in other types of systems that require high availability. These other systems may for instance be data communications systems, medical systems, military systems and financial systems.

While the present invention has been described with respect to particular embodiments (including certain device arrangements and certain orders of steps within various methods), those skilled in the art will recognize that the present invention is not limited to the specific embodiments described and illustrated herein. Therefore, it is to be understood that this disclosure is only illustrative. Accordingly, it is intended that the invention be limited only by the scope of the claims appended hereto.

The invention claimed is:

1. A power module for use in supplying power from a power source to a power consuming unit, the power module comprising:
    at least a first and a second power input means configured to input power to the power module, wherein the first and second power input means are connected to the power source;
    power output means configured to output power from the power module to the power consuming unit;
    first power feeding means connected between the first power input means and the power output means;
    second power feeding means connected between the second power input means and the power output means,
    wherein the first power feeding means comprises first circuit breaking means configured to limit high currents flowing from the power source through the first circuit breaking means and through the power output to a current lower than a current causing a voltage drop at the power source by disconnecting the first power feeding means from the power source;
    wherein the second power feeding means comprises second circuit breaking means configured to limit high currents flowing from the power source through the second circuit breaking means and through the power output to a current lower than a current causing a voltage drop at the power source by disconnecting the first power feeding means from the power source;
    wherein the first circuit breaking means and the second circuit breaking means further comprises register means configured to register if the first and second circuit breaking means have disconnected the first and second power feeding means respectively; and
    wherein the first and second circuit breaking means are further connected to a controller, the controller being configured to read the register means.

2. The power module of claim 1, wherein the first and second circuit breaking means are further configured to respectively disconnect the first and second power feeding means when a current in an opposite direction relative to normal operation is detected.

3. The power module of claim 1, wherein the first and second circuit breaking means are further configured to rapidly disconnect the first and second power feeding means when a higher excess current relative to a lower excess current is detected.

4. The power module of claim 1, wherein the first circuit breaking means and the second circuit breaking means, respectively, comprise a metal oxide semiconductor field effect transistor (MOSFET) and wherein the first and second circuit breaking means, respectively, detect the excess currents by measuring a voltage across the MOSFET.

5. The power module of claim 1, wherein the controller is further configured to:
    control the first circuit breaking means to disconnect the first power feeding means when the controller reads that the second circuit breaking means has disconnected the second power feeding means and
    control the second circuit breaking means to disconnect the second power feeding means when the controller reads that the first circuit breaking means has disconnected the first power feeding means.

6. A power module for use in supplying a power source to a power consuming unit, the power module comprising:

at least a first and a second power input means configured to input power to the power module, wherein the first and second power input means are connected to the power source;

power output means configured to output power from the power module to the power consuming unit;

first power feeding means connected between the first power input means and the power output means;

second power feeding means connected between the second power input means and the power output means, wherein the first power feeding means comprises first circuit breaking means configured to limit high currents flowing from the power source through the first circuit breaking means and through the power output to a current lower than a current causing a voltage drop at the power source by disconnecting the first power feeding means from the power source;

wherein the second power feeding means comprises second circuit breaking means configured to limit high currents flowing from the power source through the second circuit breaking means and through the power output to a current lower than a current causing a voltage drop at the power source by disconnecting the first power feeding means from the power source; and wherein the first circuit breaking means and the second circuit breaking means further comprises self testing means configured to perform self testing on the first and second circuit breaking means, respectively, and send values from these self tests to the controller.

7. The power module of claim 1:
wherein a first fuse is connected between the power source and the first power input means;
wherein the first circuit breaking means is further configured to disconnect the first power feeding means before the first fuse trips; and
wherein a second fuse is connected between the power source and the second power input means; and
wherein the second circuit breaking means is further configured to disconnect the second power feeding means before the second fuse trips.

8. The power module of claim 1:
wherein a first resistor is connected between the power source and the first power input means;
wherein the first circuit breaking means is further configured to disconnect the first power feeding means before overheating of the first resistor;
wherein a second resistor is connected between the power source and the second power input means; and
wherein the second circuit breaking means is further configured to disconnect the second power feeding means before overheating of the second resistor.

9. The power module of claim 7, wherein the first circuit breaking means and the second circuit breaking means are further configured to limit high currents through the first and second circuit breaking means, respectively, to a current higher than $FUSE_{trip}$, which is the current at which the first and second fuses trip.

10. The power source of claim 1 for supplying power to a power consuming unit, wherein the power source comprises a power module.

11. The power consuming unit of claim 1 for receiving power from a power source, wherein the power consuming unit comprises a power module.

12. A method for supplying power from a power source to a power consuming unit, the method comprising:
receiving power in a power module through at least a first and a second power input means of the power module, wherein the first and second power input means are connected to a power source;

outputting power from the power module to the power consuming unit through power output means;

feeding power through first power feeding means connected between the first power input means and the power output means;

feeding power through second power feeding means connected between the second power input means and the power output means:

limiting high currents flowing from the power source through the first circuit breaking means connected between the first power input means and the power output means, and through the power output to a current lower than a current causing a voltage drop at the power source by disconnecting the first power feeding means from the power source;

limiting high currents flowing from the power source through the first circuit breaking means, connected between the second power input means and the power output means, and through the power output to a current lower than a current causing a voltage drop at the power source by disconnecting the second power feeding means from the power source;

registering in the first and second circuit breaking means, respectively, if the first and second circuit breaking means have disconnected the first and second power feeding means, respectively; and reading in a controller information whether the first and second circuit breaking means have disconnected the first and second power feeding means, respectively.

13. The method of claim 12, wherein disconnecting further comprises disconnecting the first and second power feeding means, respectively, when a current in an opposite direction compared to normal operation is detected.

14. The method of claim 12, wherein disconnecting further comprises rapidly disconnecting the first and second power feeding means when a higher excess current relative to a lower excess current is detected.

15. The method of claim 12 wherein disconnecting further comprises detecting the excess currents by measuring a voltage across a metal oxide semiconductor field effect transistor (MOSFET) in the first and second circuit breaking means, respectively.

16. The method of claim 12 further comprising:
disconnecting the first power feeding means when the second circuit breaking means has disconnected the second power feeding means; and
disconnecting the second power feeding means when the first circuit breaking means has disconnected the first power feeding means.

17. The method of claim 12 further comprising:
testing the first circuit breaking means in the first circuit breaking means;
testing the second circuit breaking means in the second circuit breaking means; and
sending information regarding the tests performed in the testing step to the controller.

18. The method of claim 12, wherein disconnecting the first power feeding means further comprises:
disconnecting the first power feeding means before a first fuse connected between the power ,source and the first power input means trips; and
wherein disconnecting the second power feeding means further comprises disconnecting the second power feeding means before a second fuse connected between the power source and the second power input means trips.

19. The method of claim 12, wherein disconnecting the first power feeding means further comprises:
- disconnecting the first power feeding means before overheating of a first resistor connected between the power source and the first power input means,
- wherein disconnecting the second power feeding means further comprises disconnecting the second power feeding means before overheating of a second resistor connected between the power source and the second power input means.

20. The method of claim 18, wherein disconnecting further comprises limiting high currents through the first and second circuit breaking means, respectively, to a current higher than $FUSE_{trip}$, which is the current at which the first and second fuses trips.

* * * * *

UNITED STATES PATENT AND TRADEMARK OFFICE
CERTIFICATE OF CORRECTION

PATENT NO. : 8,767,363 B2
APPLICATION NO. : 13/516300
DATED : July 1, 2014
INVENTOR(S) : Johansson et al.

It is certified that error appears in the above-identified patent and that said Letters Patent is hereby corrected as shown below:

In the Drawings

In Fig. 5, Sheet 3 of 3, for First Box, insert Tag -- 501 --.

In Fig. 5, Sheet 3 of 3, in Second Box, in Line 1, delete "OUTOUT" and insert -- OUTPUT --, therefor.

In Fig. 5, Sheet 3 of 3, for Second Box, insert Tag -- 502 --.

In Fig. 5, Sheet 3 of 3, for Third Box, insert Tag -- 503 --.

In Fig. 5, Sheet 3 of 3, for Fourth Box, insert Tag -- 504 --.

In Fig. 5, Sheet 3 of 3, for Fifth Box, insert Tag -- 505 --.

In Fig. 5, Sheet 3 of 3, for Sixth Box, insert Tag -- 506 --.

In the Specification

In Column 5, Line 25, delete "source I" and insert -- source 1 --, therefor.

In Column 7, Line 7, delete "controller 9" and insert -- controller 19 --, therefor.

In Column 7, Line 10, delete "controller 9" and insert -- controller 19 --, therefor.

In Column 7, Line 55, delete "Even tough" and insert -- Even though --, therefor.

In the Claims

In Column 8, Line 66, in Claim 6, delete "supplying a" and insert -- supplying power from a --, therefor.

In Column 10, Line 62, in Claim 18, delete "power ,source" and insert -- power source --, therefor.

Signed and Sealed this
Twentieth Day of January, 2015

Michelle K. Lee
*Deputy Director of the United States Patent and Trademark Office*